United States Patent
Zhang et al.

(10) Patent No.: US 11,570,647 B2
(45) Date of Patent: Jan. 31, 2023

(54) COMMUNICATION METHOD AND COMMUNICATIONS APPARATUS

(71) Applicant: Huawei Technologies Co., Ltd., Shenzhen (CN)

(72) Inventors: Hongping Zhang, Shanghai (CN); Tingting Geng, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/135,222

(22) Filed: Dec. 28, 2020

(65) Prior Publication Data

US 2021/0120448 A1 Apr. 22, 2021

Related U.S. Application Data

(63) Continuation of application No. PCT/CN2019/093549, filed on Jun. 28, 2019.

(30) Foreign Application Priority Data

Jun. 29, 2018 (CN) .......................... 201810701804.2

(51) Int. Cl.
*H04W 24/10* (2009.01)
*H04B 17/318* (2015.01)
(Continued)

(52) U.S. Cl.
CPC .......... *H04W 24/10* (2013.01); *H04B 17/318* (2015.01); *H04W 76/18* (2018.02);
(Continued)

(58) Field of Classification Search
CPC ..... H04W 24/10; H04W 24/00; H04W 24/02; H04W 24/04; H04W 24/06; H04W 24/08;
(Continued)

(56) References Cited

U.S. PATENT DOCUMENTS

| | | | |
|---|---|---|---|
| 2011/0183661 A1* | 7/2011 | Yi | H04W 24/10 455/422.1 |
| 2011/0194441 A1 | 8/2011 | Jung et al. | |

(Continued)

FOREIGN PATENT DOCUMENTS

| | | |
|---|---|---|
| CN | 103916904 A | 7/2014 |
| CN | 104067652 A | 9/2014 |

(Continued)

OTHER PUBLICATIONS

Ericsson, "Support of fake gNB detection mechanisms", 3GPP TSG-RAN WG2 #99 Tdoc, R2-1707802, Berlin, Germany, Aug. 21-25, 2017, 4 pages.

(Continued)

*Primary Examiner* — Huy C Ho
(74) *Attorney, Agent, or Firm* — Slater Matsil, LLP

(57) ABSTRACT

Embodiments of this application provide a communication method and a communications apparatus. The method includes: generating a log record, where the log record is recorded by performing MDT log measurement when a terminal is in an inactive state; and when the terminal is in a connected state, sending the generated log record to a network device.

20 Claims, 5 Drawing Sheets

(51) Int. Cl.
  *H04W 76/19* (2018.01)
  *H04W 76/18* (2018.01)
  *H04W 76/27* (2018.01)
  *H04W 92/10* (2009.01)
(52) U.S. Cl.
  CPC .......... *H04W 76/19* (2018.02); *H04W 76/27* (2018.02); *H04W 92/10* (2013.01)
(58) Field of Classification Search
  CPC ... H04W 72/00; H04W 72/02; H04W 72/005; H04W 72/0406; H04W 72/085; H04W 72/08; H04W 72/087
  USPC ......................................................... 370/329
  See application file for complete search history.

(56) References Cited

U.S. PATENT DOCUMENTS

| | | |
|---|---|---|
| 2013/0053017 A1 | 2/2013 | Chang |
| 2013/0121204 A1* | 5/2013 | Lee ...................... H04W 24/10 370/252 |
| 2016/0112893 A1 | 4/2016 | Jung et al. |

FOREIGN PATENT DOCUMENTS

| | | |
|---|---|---|
| CN | 104105114 A | 10/2014 |
| JP | 2013519330 A | 5/2013 |
| JP | 2016509814 A | 3/2016 |
| KR | 20110093643 A | 8/2011 |
| WO | 2013168776 A1 | 11/2013 |
| WO | 2015106553 A1 | 7/2015 |
| WO | 2020175868 A1 | 9/2020 |

OTHER PUBLICATIONS

Nokia et al., "MDT and Trace support in NG-RAN", 3GPP TSG-RAN WG3 NR AdHoc 1801, R3-180097,Sophia Antipolis, France, Jan. 22-26, 2018, 6 pages.
3GPP TS 23.122 V15.4.0 (Jun. 2018); 3rd Generation Partnership Project; Technical Specification Group Core Network and Terminals; Non-Access-Stratum (NAS) functions related to Mobile Station (MS) in idle mode (Release 15); 60 pages.
3GPP TS 24.501 V15.0.0 (Jun. 2018), 3rd Generation Partnership Project; Technical Specification Group Core Network and Terminals; Non-Access-Stratum (NAS) protocol for 5G System (5GS); Stage 3 (Release 15), 337 pages.
3GPP TS 36.304 V14.6.0 (Mar. 2018); 3rd Generation Partnership Project; Technical Specification Group Radio Access Network; Evolved Universal Terrestrial Radio Access (E-UTRA); User Equipment (UE) procedures in idle mode (Release 14); 50 pages.
3GPP TS 36.331 V15.2.1 (Jun. 2018); 3rd Generation Partnership Project; Technical Specification Group Radio Access Network; Evolved Universal Terrestrial Radio Access (E-UTRA); Radio Resource Control (RRC); Protocol specification (Release 15); 791 pages.
3GPP TS 38.133 V15.1 0 (Mar. 2018), 3rd Generation Partnership Project; Technical Specification Group Radio Access Network; NR; Requirements for support of radio resource management (Release 15), 59 pages.
3GPP TS 38.300 V1 5.2.0 (Jun. 2018), 3rd Generation Partnership Project; Technical Specification Group Radio Access Network; NA; NA and NG-RAN Overall Description; Stage 2 (Release 15), 87 pages.
3GPP TS 38.304 V15.0.0 (Jun. 2018), 3rd Generation Partnership Project; Technical Specification Group Radio Access Network; NR; User Equipment (UE) procedures in Idle mode and RRC Inactive state (Release 15); 25 pages.
3GPP TS 38.331 V15.2.1 (Jun. 2018), 3rd Generation Partnership Project; Technical Specification Group Radio Access Network; NR; Radio Resource Control (RRC) protocol specification (Release 15), 303 pages.
3rd Generation Partnership Project; Technical Specification Group Radio Access Network; NR; Radio Resource Control (RRC) protocol specification (Release 15), 3GPP TS 38 331 V15.1.0 (Mar. 2018), 271 pages.
Research in Motion, UK LTD., "Logged MDT measurement configurations", 3GPP TSG RAN WG2 Meeting #70bis, R2-103769, Stockholm, Sweden, Jun. 28-Jul. 2, 2010, 4 pages.
Ericsson, "Inactive state in LTE", 3GPP TSG-RAN WG2 #99, R2-1707795, Berlin, Germany, Aug. 21-25, 2017, 7 pages.

* cited by examiner

COMMUNICATION METHOD AND COMMUNICATIONS APPARATUS

CROSS-REFERENCE TO RELATED APPLICATIONS

This application is a continuation of International Application No. PCT/CN2019/093549, filed on Jun. 28, 2019, which claims priority to Chinese Patent Application No. 201810701804.2, filed on Jun. 29, 2018. The disclosures of the aforementioned applications are hereby incorporated by reference in their entireties.

TECHNICAL FIELD

Embodiments of this application relate to the field of communications technologies, and in particular, to a communication method and a communications apparatus.

BACKGROUND

A mobile network operator needs to assess quality of a mobile network within a coverage area of a base station. The assessment includes identifying coverage quality and a coverage hole, and the like. In the early stage, a manual drive test was performed for assessment. The drive test mainly includes the following. First, a test area is determined, and then a test route is designed. Then, a vehicle is manually driven according to the test route, to collect measurement data. The measurement data may include, for example, location information, physical layer information, media access control layer information, signaling information, and system information. Finally, the collected measurement data is processed. The processing process may include, for example, data analysis, and problem identification and analysis. The data analysis is mainly performed to analyze a call drop rate, a call completion rate, traffic, and the like, based on the collected data. The problem identification and analysis is mainly performed to analyze whether a fault occurs on a terminal or a network based on the collected data.

In the foregoing manual drive test, a test person needs to drive a vehicle in person. This is time-consuming and labor-consuming. Therefore, minimization of drive tests (MDT) is currently proposed to resolve the foregoing problem. The MDT means the following. Some specific terminals perform MDT log measurement, and then report log records to a network device, where reported content includes: data related to a radio access network (RAN) and data related to quality of service (QoS); and then, the network device performs mobile network quality assessment based on the log records reported by the terminals. A log record reported by a terminal may be obtained by the terminal in the following two cases. In one case, when the terminal is in an idle state, the terminal performs MDT log measurement based on a measurement configuration received from the network device, to obtain the reported log record. In the other case, when the terminal is in a connected state, if a radio link failure (RLF) occurs, the MDT log measurement is performed to obtain the reported log record. However, due to evolution of mobile communications systems, existing log record reporting cannot meet a network requirement.

SUMMARY

Embodiments of this application provide a communication method and a communications apparatus, so that a network device can obtain more log records for mobile network quality assessment. Therefore, a network requirement of a mobile communications system (for example, a 5G system) is satisfied, and flexibility of the mobile network quality assessment is improved.

According to a first aspect, an embodiment of this application provides a communication method, including: generating a log record, where the log record is recorded by performing MDT log measurement when a terminal is in an inactive state, the log record includes any one or a combination of location information of the terminal, a signal measurement value of a serving cell of the terminal, and a signal measurement value of at least one neighboring cell of the terminal, and the inactive state refers to a radio resource control (RRC) state in which an air interface connection is suspended and context information is retained; and then when the terminal is in a connected state, sending the generated log record to a network device. Therefore, the network device can obtain more log records for mobile network quality assessment, so that a network requirement of a mobile communications system (for example, a 5G system) is satisfied, and flexibility of the mobile network quality assessment is improved.

Optionally, the generating a log record includes: when a first time interval expires, generating the log record; and/or when RRC connection resume fails, generating the log record. Therefore, the log record in this embodiment is not limited to a periodically generated log record, but includes log records of multiple types. The network device may perform mobile network assessment based on different types of log records, so that a plurality of network requirements of the mobile communications system are further satisfied, and the flexibility of the mobile network quality assessment is further improved.

Optionally, the method further includes: receiving MDT log measurement configuration information; and the performing MDT log measurement includes: performing the MDT log measurement based on the MDT log measurement configuration information.

Optionally, the receiving MDT log measurement configuration information includes: receiving the MDT log measurement configuration information through an RRC message; after the receiving MDT log measurement configuration information, the method further includes: starting a timer, where duration of the timer is the duration; and the performing MDT log measurement includes: performing the MDT log measurement based on the log measurement configuration information before the timer expires. In this way, the terminal is prevented from always performing the MDT log measurement based on the MDT log measurement configuration information, so that the terminal can perform the MDT log measurement more flexibly.

Optionally, the MDT log measurement configuration information includes a measurement threshold; and the generating a log record includes: generating the log record when the signal measurement value of the serving cell is less than or equal to the measurement threshold. Therefore, a signal measurement value that is of a serving cell and that is greater than the measurement threshold does not need to be reported to the network device, so that a quantity of generated log records is reduced.

Optionally, the method further includes: storing, in a first variable, the log record generated when the first time interval expires; and/or storing, in a second variable, the log record generated when the RRC connection resume fails. The two types of log records are stored in different variables, so that each type of log record can be easily and quickly found, thereby improving sending efficiency of the log records.

Optionally, before the sending the generated log record to a network device, the method further includes: sending a first message to the network device, where the first message includes information used to indicate that the terminal has the log record generated based on the first time interval, and/or information used to indicate that the terminal has the log record generated based on the RRC connection resume failure; and then, receiving a second message from the network device, where the second message includes information used to request the log record. Therefore, the terminal sends the log record to the network device only when the network device needs to request the log record, to avoid a waste of transmission resources.

According to a second aspect, an embodiment of this application provides a communication method, including: receiving a log record from a terminal; and then processing the log record, where the log record is generated by performing MDT log measurement when the terminal is in an inactive state, where the inactive state refers to an RRC state in which an air interface connection is suspended and context information is retained; and the log record includes any one or a combination of location information of the terminal, a signal measurement value of a serving cell of the terminal, and a signal measurement value of at least one neighboring cell of the terminal. Therefore, the network device can obtain more log records for mobile network quality assessment, so that a network requirement of a mobile communications system (for example, a 5G system) is satisfied, and flexibility of the mobile network quality assessment is improved.

Optionally, the log record is generated by the terminal when a first time interval expires, and/or generated when RRC connection resume fails. Therefore, the log record in this embodiment is not limited to a periodically generated log record, but includes log records of multiple types. The network device may perform mobile network assessment based on different types of log records, so that a plurality of network requirements of the mobile communications system are further satisfied, and the flexibility of the mobile network quality assessment is further improved.

Optionally, the method further includes: sending MDT log measurement configuration information to the terminal, and the MDT log measurement configuration information is used by the terminal to perform the MDT log measurement.

Optionally, the sending MDT log measurement configuration information to the terminal includes: sending the MDT log measurement configuration information to the terminal through an RRC message.

Optionally, the MDT log measurement configuration information further includes a measurement threshold, and the measurement threshold is used by the terminal to generate the log record when the signal measurement value of the serving cell is less than or equal to the measurement threshold. Therefore, a quantity of log records generated by the terminal may be reduced, and a quantity of log records received by the network device may also be reduced.

Optionally, before the receiving a log record from a terminal, the method further includes: receiving a first message from the terminal, where the first message includes information used to indicate that the terminal has the log record generated based on the first time interval, or information used to indicate that the terminal has the log record generated based on the RRC connection resume failure; and then sending a second message to the terminal, where the second message includes information used to request the log record. Therefore, the network device requests the log record from the terminal when the network device needs the log record, and then receives the log record from the terminal, to avoid a waste of transmission resources.

With reference to the first aspect or the second aspect, the following may be further included.

Optionally, the RRC message is a message used to indicate the terminal to enter the inactive state. Therefore, the RRC message may be used to carry the MDT log measurement configuration information, and no new message needs to be added.

Optionally, the MDT log measurement configuration information includes first information, and the first information is used to indicate that the MDT log measurement includes signal quality measurement.

Optionally, the MDT log measurement configuration information further includes second information, and the second information indicates that a semaphore in the signal quality measurement includes any one or a combination of reference signal received power (RSRP), reference signal received quality (RSRQ), and a signal to interference plus noise ratio (SINR).

Optionally, the MDT log measurement configuration information includes third information, and the third information indicates the first time interval.

Optionally, the MDT log measurement configuration information includes fourth information, and the fourth information indicates duration of the MDT log measurement configuration information. In this way, the terminal is prevented from always performing the MDT log measurement based on the MDT log measurement configuration information, so that the terminal can perform the MDT log measurement more flexibly.

Optionally, the signal measurement value includes any one or a combination of a cell signal measurement value and a signal measurement value of a downlink beam. Therefore, the log record may include the signal measurement value of the downlink beam, and is more applicable to quality assessment on a mobile network having a beam.

Optionally, the log record further includes fifth information, and the fifth information indicates that the terminal is in the inactive state when the log record is generated, so that the log record is distinguished from a log record generated when the terminal is in another RRC state. Log records in different RRC states are used to perform mobile network assessment, so that accuracy of the mobile network assessment may be further improved.

According to a third aspect, an embodiment of this application provides a communications apparatus, including: a module, part, or circuit that is configured to implement the communication method according to the first aspect; or a module, part, or circuit that is configured to implement the communication method according to the second aspect.

According to a fourth aspect, an embodiment of this application provides a communications apparatus, including a processor and a transceiver. The processor and the transceiver are configured to perform the communication method according to any one of the embodiments of this application in the first aspect or the second aspect.

According to a fifth aspect, an embodiment of this application provides a chip, including a memory and a processor. The memory is configured to store a program instruction, and the processor is configured to invoke the program instruction in the memory to perform the communication method according to any one of the embodiments of this application in the first aspect or the second aspect.

According to a sixth aspect, an embodiment of this application provides a readable storage medium. The readable storage medium stores a computer program. When the computer program is executed, the communication method according to any one of the embodiments of this application in the first aspect or the second aspect is implemented.

According to a seventh aspect, an embodiment of this application provides a program product. The program product includes a computer program, and the computer program is stored in a readable storage medium. At least one processor of a communications apparatus may read the computer program from the readable storage medium, and the at least one processor executes the computer program, so that the communications apparatus implements the communication method according to any one of the embodiments of this application in the first aspect or the second aspect.

DETAILED DESCRIPTION OF ILLUSTRATIVE EMBODIMENTS

Figure 1:
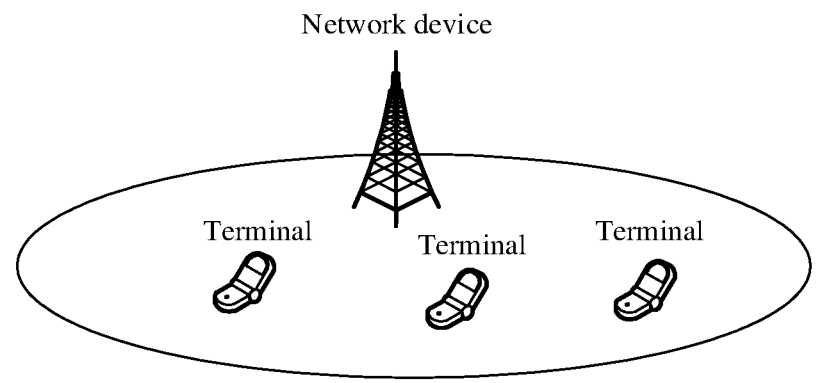
FIG. 1 is a schematic diagram of a communications system according to an embodiment of this application.

FIG. 1 is a schematic diagram of a communications system according to an embodiment of this application. As shown in FIG. 1, the communications system includes a network device and terminals.

Figure 2:
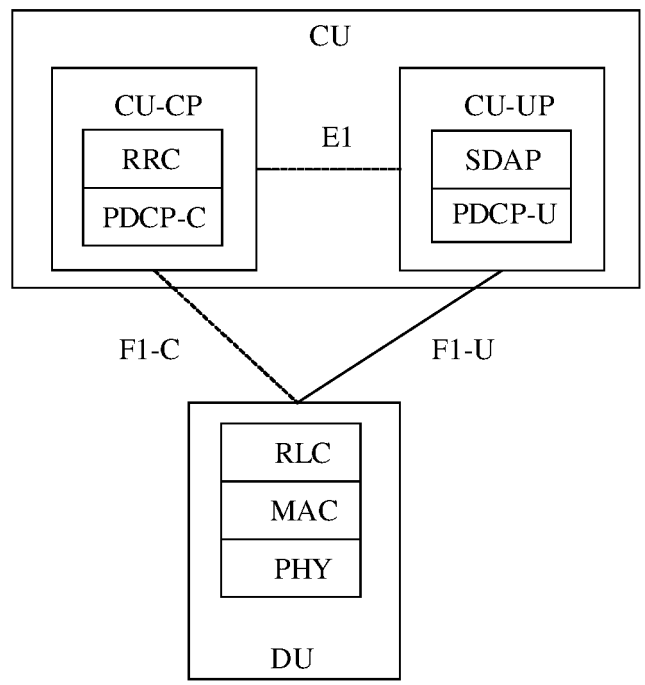
FIG. 2 is a schematic diagram of a protocol stack of a network device according to an embodiment of this application.

Some terms in this application are explained in the following, to help a person skilled in the art have a better understanding:

A network device is also referred to as a radio access network (RAN) device, is a device that enables a terminal to access a wireless network, and may be an evolved NodeB (eNB or eNodeB) in long term evolution (LTE), a relay station or an access point, or a base station in a 5G network, for example, a transmission reception point (TRP) or a controller. This is not limited herein. In a possible implementation, an access network device may be a base station (for example, a gNB) having a CU-DU separation architecture. As shown in FIG. 2, FIG. 2 is a schematic diagram of a protocol stack of a network device according to an embodiment of this application. The RAN device may be connected to a core network device (for example, an LTE core network or a 5G core network). A CU and a DU may be understood as division of the base station from a logical function perspective. The CU and the DU may be physically separated or physically deployed together. A plurality of DUs may share one CU. One DU may alternatively be connected to a plurality of CUs (not shown in the figure). The CU and the DU may be connected by using an interface, for example, an F1 interface. The CU and the DU may be divided based on protocol layers of a wireless network. For example, functions of a radio resource control (RRC) layer, a service data adaptation protocol (SDAP) layer, and a packet data convergence protocol (PDCP) layer are distributed to the CU, and functions of a radio link control (RLC) layer, a media access control (MAC) layer, a physical (PHY) layer, and the like are distributed to the DU. It may be understood that, division into processing functions of the CU and the DU based on the protocol layers is merely an example, and the processing functions of the CU and the DU may alternatively be divided in another manner. For example, the CU or the DU may be divided to have functions of more protocol layers. For example, the CU or the DU may alternatively be divided to have some processing functions of protocol layers. In a design, some functions of the RLC layer and a function of a protocol layer above the RLC layer are distributed to the CU, and a remaining function of the RLC layer and a function of a protocol layer below the RLC layer are distributed to the DU. In another design, functions of the CU or the DU may alternatively be divided based on a service type or another system requirement. For example, division is performed based on a delay. Functions whose processing time needs to meet a delay requirement are distributed to the DU, and functions that do not need to meet the delay requirement are distributed to the CU. In another design, the CU may alternatively have one or more functions of a core network. One or more CUs may be disposed in a centralized manner or a separated manner. For example, the CUs may be disposed on a network side for centralized management. The DU may have a plurality of radio frequency functions, and the radio frequency functions may be remotely set.

Functions of the CU may be implemented by one entity, or may be implemented by different entities. For example, the functions of the CU may be further divided. For example, a control plane (CP) is separated from a user plane (UP), namely, a control plane of the CU (CU-CP) and a user plane of the CU (CU-UP). For example, the CU-CP and the CU-UP may be implemented by different function entities. The CU-CP and the CU-UP may be coupled to the DU to jointly implement functions of the base station. In a possible implementation, the CU-CP is responsible for a control plane function, and mainly includes RRC and PDCP-C. The PDCP-C is mainly responsible for data encryption and decryption, integrity protection, data transmission, and the like on the control plane. The CU-UP is responsible for user plane functions, and mainly includes SDAP and PDCP-U. The SDAP is mainly responsible for processing data of the core network and mapping a data flow to a bearer. The PDCP-U is mainly responsible for encryption and decryption, integrity protection, header compression, serial number maintenance, data transmission, and the like on a data plane. The CU-CP is connected to the CU-UP by using an E1 interface. The CU-CP represents that the gNB is connected to the core network by using an Ng interface. The CU-CP is connected to the DU by using an F1-C (control plane) interface. The CU-UP is connected to the DU by using an F1-U (user plane) interface. Certainly, another possible implementation is that the PDCP-C is also in the CU-UP.

A terminal may be a wireless terminal or a wired terminal. The wireless terminal may refer to a device having a wireless transceiver function, and may be deployed on land, including indoor or outdoor devices, handheld devices, or vehicle-mounted devices; or may be deployed on a water surface (for example, on a steamboat); or may be deployed in the air (for example, on an airplane, a balloon, or a satellite). The terminal may be a mobile phone, a tablet computer (Pad), a computer having a wireless transceiver function, a virtual reality (VR) terminal, an augmented reality (AR) terminal, a wireless terminal in industrial control (industrial control), a wireless terminal in self driving, a wireless terminal in telemedicine (remote medical), a wireless terminal in smart grid, a wireless terminal in transportation safety, a wireless terminal in smart city, a wireless terminal in smart home, or the like. This is not limited herein. It may be understood that, in the embodiments of this application, the terminal may also be referred to as user equipment (UE).

In a 5G mobile communications system, in addition to an idle state and a connected state, a radio resource control (RRC) state of the terminal further includes an inactive state. In the inactive state, an air interface connection is suspended, but the terminal still stores context information. When the terminal needs to enter the connected (active) state, the terminal can quickly return to the connected state based on the stored context information. Correspondingly, when the terminal enters the inactive state, the base station also stores the context information of the terminal.

Figure 3:
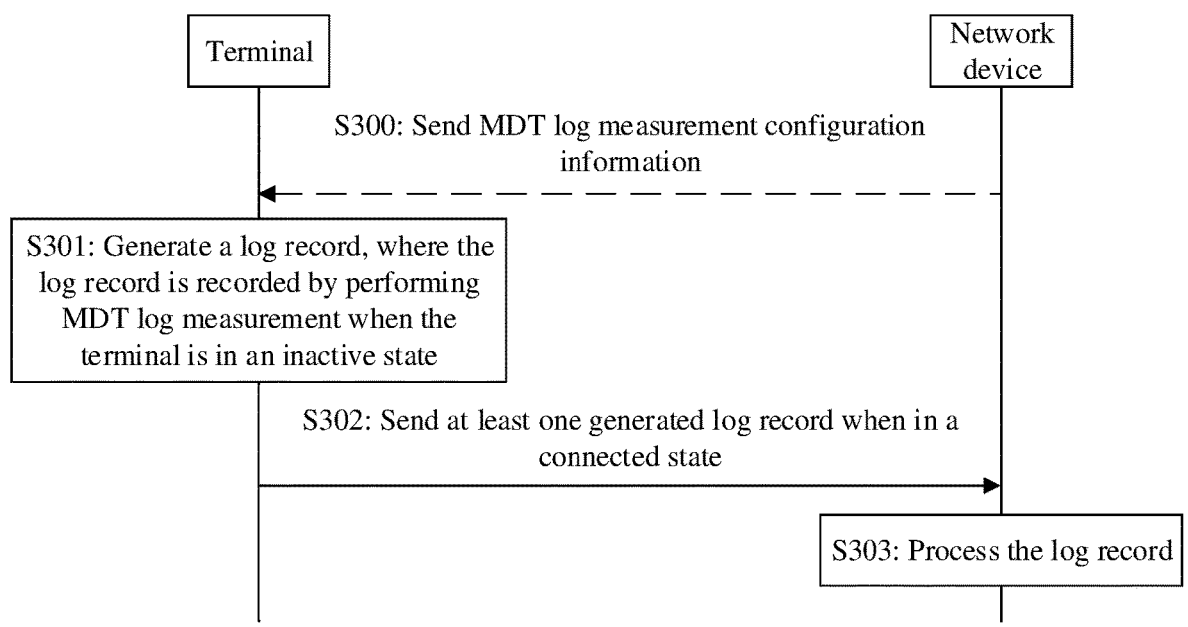
FIG. 3 is a flowchart of a communication method according to an embodiment of this application.

FIG. 3 is a flowchart of a communication method according to an embodiment of this application. As shown in FIG. 3, the method in this embodiment may include the following steps.

S301: A terminal generates a log record, where the log record is recorded by performing MDT log measurement when the terminal is in an inactive state.

In this embodiment, when in the inactive state, the terminal performs the MDT log measurement, so that the log record may be generated. The log record includes any one or a combination of location information of the terminal, a signal measurement value of a serving cell of the terminal, and a signal measurement value of at least one neighboring cell of the terminal.

In a possible manner, the terminal may store the generated log record.

For example, the log record includes the location information of the terminal; or the log record includes the signal measurement value of the serving cell of the terminal; or the log record includes the signal measurement value of the at least one neighboring cell of the terminal; or the log record includes the location information of the terminal and the signal measurement value of the serving cell of the terminal; or the log record includes the location information of the terminal and the signal measurement value of the at least one neighboring cell of the terminal; or the log record includes the signal measurement value of the serving cell of the terminal and the signal measurement value of the at least one neighboring cell of the terminal; or the log record includes the location information of the terminal, the signal measurement value of the serving cell of the terminal, and the signal measurement value of the at least one neighboring cell of the terminal.

The location information of the terminal may be geographical location information, for example, geographical location information obtained by using a satellite positioning system, or may be information about a serving cell in which the terminal is currently located and/or information about a neighboring cell.

Optionally, the terminal performs the MDT log measurement after entering the inactive state, and generates the log record when a specific condition is satisfied.

In a possible manner, the satisfied specific condition may be that, for example, a first time interval expires. For example, the terminal may generate the log record when the first time interval expires. If the first time interval is 10 ms, after entering the inactive state, the terminal performs the MDT log measurement and generates the log record every 10 ms. Optionally, after the terminal enters a connected state, the terminal stops generating the log record. The first time interval may be, for example, configured by a network device for the terminal, or may be a predefined default value. This is not limited in this embodiment of this application.

Alternatively, the satisfied specific condition may be that, for example, RRC connection resume fails. For example, the terminal may generate the log record when the RRC connection resume fails. To be specific, the terminal performs the MDT log measurement after entering the inactive state, and if the RRC connection resume fails, generates the log record.

In some embodiments, the satisfied specific condition may be that, for example, a first time interval expires or an RRC connection resume fails. To be specific, generation of the log record is triggered when the first time interval expires or when the RRC connection resume fails. For example, the terminal may generate the log record when the first time interval expires, and also generate the log record when the RRC connection resume fails.

Therefore, the log record generated by the terminal may include the log record generated based on the first time interval, and may also include the log record generated based on the RRC connection resume failure. Types of the two log records are different. Therefore, the two types of log records may be classified and stored on a terminal side, that is, placed in different variables. For example, a first variable corresponds to the periodically generated log record, and a second variable corresponds to the log record generated when the RRC connection resume fails.

The log record in this embodiment is not limited to the periodically generated log record, but includes log records of multiple types. The network device may perform mobile network assessment based on different types of log records, so that a plurality of network requirements of a mobile communications system are further satisfied, and flexibility of the mobile network quality assessment is further improved. In addition, the two types of log records are stored in different variables, so that each type of log record can be easily and quickly found, thereby improving sending efficiency of the log records.

It may be understood that, the log record generated by the terminal may include one or more log records. This is not limited in this embodiment of this application.

S302: Send the generated log record to the network device when the terminal is in a connected state.

S303: The network device processes the log record.

Optionally, in this embodiment of this application, after receiving the log record, the network device may perform corresponding processing, for example, storage and/or analytical processing. The analytical processing may include, for example, quality assessment on a mobile network within a coverage area of the network device and/or optimization of the mobile network. A specific processing behavior of the network device is not limited in this embodiment of this application.

In this embodiment, after the terminal enters the connected state from the inactive state, the terminal may send, to the network device, the log record generated when the terminal is in the inactive state. Optionally, the terminal may send, to the network device, the log record that is stored by the terminal and generated when the terminal is in the inactive state. For example, the terminal generates 100 log records in total when the terminal is in the inactive state. Because storage space of log records stored in the terminal is limited, the terminal may store only latest 50 log records. In this case, the terminal sends the 50 log records generated by the terminal to the network device. Correspondingly, the network device receives the log record from the terminal, and then processes the received log record. For example, the network device processes the log record, to assess the quality of the mobile network within the coverage area of the network device and optimize the mobile network.

In some other embodiments, the terminal may also send the log record to the network device when the terminal is in another RRC state (for example, the inactive state).

According to the communication method provided in this embodiment, when in the inactive state, the terminal performs the MDT log measurement, and also generates the log record. In addition, when in the connected state, the terminal sends the generated log record to the network device. Therefore, the network device can obtain more log records for mobile network quality assessment, so that a network requirement of a mobile communications system (for example, a 5G system) is satisfied, and flexibility of the mobile network quality assessment is improved.

In some embodiments, after entering the connected state and before sending the log record to the network device, the terminal sends a first message to the network device. The first message includes information used to indicate that the terminal has log records generated based on the first time interval, and/or information used to indicate that the terminal has log records generated based on the RRC connection resume failure. In some other embodiments, the first message includes information used to indicate that the terminal has log records. The information is used to notify the network device that the terminal has the log records, but does not notify the network device whether the log records are generated based on the first time interval or generated based on the RRC connection resume failure. If a plurality of generated log records are all generated by the terminal at the first time interval, the first message includes information used to indicate that the terminal has the log records generated based on the first time interval. If a plurality of generated log records are all generated by the terminal when the RRC connection resume fails, the first message includes information used to indicate that the terminal has the log records generated based on the RRC connection resume failure. If some of log records are generated by the terminal at the first time interval, and the remaining log records are generated by the terminal when the RRC connection resume fails, the first message includes information used to indicate that the terminal has the log records generated based on the first time interval, and information used to indicate that the terminal has the log records generated based on the RRC connection resume failure.

Correspondingly, the network device receives the first message from the terminal, determines, based on the first message, types of the log records or how the log records in the terminal are generated, and then determines whether the network device needs to obtain the log records. If the network device determines that the network device needs to obtain the log records, the network device sends a second message to the terminal. The second message includes information used to request the log records. Correspondingly, the terminal receives the second message from the network device, determines, based on the second message, that the network device needs to obtain the log records, and then sends the log records generated by the terminal to the network device. Therefore, the terminal sends the log records to the network device only when the network device needs to request the log records, to avoid a waste of transmission resources.

Optionally, if the network device needs to obtain a log record generated based on the first time interval, the second message may include information used for requesting the log record generated based on the first time interval. If the network device needs to obtain a log record generated based on the RRC connection resume failure, the second message may include information used for requesting the log record generated based on the RRC connection resume failure. If the network device needs to obtain the two types of log records, the second message may include information used for requesting a log record, but the information does not indicate a type of log record required by the network device. After receiving the information, the terminal sends all log records stored in the terminal to the network device. If the network device needs to obtain the two types of log records, the second message may include information used for requesting the log record generated based on the first time interval and the log record generated based on the RRC connection resume failure.

Optionally, before the terminal sends the first message to the network device, the terminal enters the connected state from the inactive state. For example, the terminal sends an RRC resume request (RRC resume Request) message to the network device. Then, the network device sends an RRC resume (RRC resume) message to the terminal based on the received RRC resume request message, and the terminal enters the connected mode based on the received RRC resume message. After entering the connected state, the terminal sends the first message to the network device. The first message may be, for example, an RRC resume complete message. The second message is, for example, a UE information request message. After receiving the UE information request message, the terminal may send the generated log record to the network device through a UE information response message.

Optionally, before S301, the method may further include step S300.

S300: The network device sends MDT log measurement configuration information to the terminal.

In this embodiment, the network device may send the MDT log measurement configuration information to the terminal. Correspondingly, the terminal receives the MDT log measurement configuration information from the network device. Then, the terminal performs S301 and S302. After entering the inactive state, the terminal may perform the MDT log measurement based on the MDT log measurement configuration information. It should be noted that the network device sending the log measurement configuration information to the terminal and the network device to which the terminal sends the log record may be a same network device or different network devices. FIG. 3 is shown by using an example in which the network device sending the log measurement configuration information to the terminal and the network device to which the terminal sends the log record are a same network device. This application is not limited thereto.

In some embodiments, the network device may send the MDT log measurement configuration information to the terminal through an RRC message. Correspondingly, the terminal receives the RRC message from the network device, and obtains the MDT log measurement configuration from the RRC message.

Optionally, the RRC message may be a message used to indicate the terminal to enter the inactive state. To be specific, the network device may send the MDT log measurement configuration information to the terminal while configuring the terminal to enter the inactive state. Correspondingly, after receiving the RRC message, the terminal enters the inactive state, and then performs S301 and S302. The RRC message is, for example, an RRC connection release message that carries information used to indicate the terminal to enter the inactive state. Therefore, the RRC message may be used to carry the MDT log measurement configuration information, and no new message needs to be added. It may be understood that the MDT log measurement configuration information may alternatively not be sent. To be specific, the RRC message may not carry the MDT log measurement configuration information. After receiving the RRC message, the terminal may perform the MDT log measurement based on a default (for example, predefined) parameter or setting.

It may be understood that the MDT log measurement configuration information may alternatively be sent through another message or in another form. For example, the MDT log measurement configuration information is sent through one piece of dedicated signaling. This is not limited in this embodiment of this application.

In some embodiments, the MDT log measurement configuration information includes first information. The first information is used to indicate that the MDT log measurement includes signal quality measurement. Correspondingly, the terminal performs the signal quality measurement while performing the MDT log measurement.

The first information may also be used to indicate that performing MDT log measurement includes performing signal strength measurement.

It may be understood that signal quality may be represented by signal strength. Based on this understanding, it may be considered that signal quality measurement also includes signal strength measurement.

Alternatively, signal quality measurement and signal strength measurement may be considered as different dimensions. Optionally, the first information may be used to indicate that the MDT log measurement includes signal quality measurement and/or signal strength measurement. Correspondingly, the terminal performs the signal quality measurement and the signal strength measurement while performing the MDT log measurement.

In this embodiment of this application, a signal strength measurement value and a signal quality measurement value may be collectively referred to as a signal measurement value. Certainly, optionally, the MDT log measurement configuration information further includes second information, and the second information indicates that a semaphore in the signal quality measurement includes any one or a combination of reference signal received power (RSRP), reference signal received quality (RSRQ), and a signal to interference plus noise ratio (SINR). The SINR may be used to represent the signal quality.

For example, the semaphore in the signal quality measurement includes the RSRP; or the semaphore in the signal quality measurement includes the RSRQ; or the semaphore in the signal quality measurement includes the SINR; or the semaphore in the signal quality measurement includes the RSRP and the RSRQ; or the semaphore in the signal quality measurement includes the RSRP and the SINR; or the semaphore in the signal quality measurement includes the RSRQ and the SINR; or the semaphore in the signal quality measurement includes the RSRP, the RSRQ, and the SINR.

Correspondingly, when performing the MDT log measurement, the terminal measures any one or a combination of RSRP, RSRQ, and an SINR of a signal based on the second information. Therefore, a signal measurement value included in the log record generated by the terminal is a measurement value of any one or a combination of the RSRP, the RSRQ, and the SINR.

Optionally, the signal quality measurement may include multimedia broadcast multicast service single frequency network (MBSFN) measurement, and any one or a combination of the RSRP, the RSRQ, and the SINR may be obtained through the MBSFN measurement.

In some embodiments, the MDT log measurement configuration information may include a measurement threshold. The terminal determines whether the signal measurement value of the serving cell is greater than the measurement threshold when the first time interval expires. If the signal measurement value of the serving cell is less than or equal to the measurement threshold, the terminal generates a log record. If the signal measurement value of the serving cell is greater than the measurement threshold, the terminal does not generate a log record. If the signal measurement value of the serving cell is greater than the measurement threshold, it may be considered that signal quality of the serving cell is good and an air interface is normal. In this case, the signal measurement value of the serving cell does not need to be reported to the network device, thereby reducing a quantity of generated log records.

Optionally, the signal measurement value may include a signal quality value. The signal quality value may be represented by using, for example, any one or a combination of the RSRP, the RSRQ, and the SINR. Alternatively, the signal measurement value may include a signal quality value and a signal strength value. The signal quality value may be represented by using, for example, the RSRQ and the SINR, and the signal strength value may be represented by using the RSRP. Alternatively, the signal measurement value may include a signal strength value. The signal measurement value may be represented by using, for example, the RSRP.

In some embodiments, the MDT log measurement configuration information may include third information, and the third information indicates the first time interval. Therefore, after receiving the MDT log measurement configuration information, the terminal obtains the first time interval from the MDT log measurement configuration information. After entering the inactive state, the terminal performs the MDT log measurement, and generates the log record when the first time interval obtained from the MDT log measurement configuration information expires. In a possible manner, after the terminal receives the MDT log measurement configuration information, when the terminal enters the inactive state, the terminal starts a periodic timer (which may also be referred to as a first timer). Duration of the periodic timer is a length of the obtained first time interval. When the periodic timer expires, the terminal generates the log record, and restarts the periodic timer. The first time interval in this embodiment is configured by the network device for the terminal.

In some embodiments, the MDT log measurement configuration information may include fourth information, and the fourth information indicates duration of the MDT log measurement configuration information. Therefore, after receiving the MDT log measurement configuration information, the terminal starts a timer (which may also be referred to as a second timer), and sets a value of the second timer to the duration. If the second timer does not expire, the MDT log measurement configuration information is valid, and the terminal performs the MDT log measurement based on the MDT log measurement configuration information. If the second timer expires, the MDT log measurement configuration information is invalid, and the terminal no longer performs the MDT log measurement based on the MDT log measurement configuration information. Therefore, the terminal is prevented from always performing the MDT log measurement based on the MDT log measurement configuration information, so that the terminal can perform the MDT log measurement more flexibly.

Optionally, if the terminal enters the connected state from the inactive state before the second timer expires, the second timer may continue running, but the terminal in the connected state neither performs the MDT log measurement nor generates a log record during running of the second timer; and if the second timer continues running after the terminal enters the inactive state again from the connected state or enters an idle state from the connected state before the second timer expires, during the running of the second timer, the terminal in the inactive state or the idle state may perform the MDT log measurement based on the MDT log measurement configuration information, and generate a log record. If the terminal enters the idle state from the inactive state before the second timer expires, the second timer may continue running, and during running of the second timer, the terminal in the idle state performs measurement based on log measurement configuration information applicable to the terminal in the idle state, and also generates a log record. In addition, in another possible manner, if the terminal enters the connected state or the idle state from the inactive state before the second timer expires, the second timer may continue running, and the terminal in the connected state or the idle state neither performs the MDT log measurement nor generates a log record during running of the second timer. Alternatively, in still another possible manner, if the terminal enters the connected state or the idle state from the inactive state before the second timer expires, the second timer stops; and if the terminal is in the idle state, the terminal in the idle state may perform measurement based on log measurement configuration information applicable to the terminal in the idle state, and generate a log record.

In some embodiments, the MDT log measurement configuration information may include information used to indicate the terminal to perform the MDT log measurement in the inactive state, or information used to indicate the terminal to perform the MDT log measurement in both the inactive state and the idle state. If the MDT log measurement configuration information further includes information used to indicate the terminal to perform the MDT log measurement in the inactive state, it indicates that the MDT log measurement configuration information is applicable to performing the MDT log measurement by the terminal in the inactive state, but is not applicable to performing the MDT log measurement by the terminal in the idle state, and the terminal in the idle state may perform the MDT log measurement based on other MDT log measurement configuration information. If the MDT log measurement configuration information further includes information used to indicate the terminal to perform the MDT log measurement in both the inactive state and the idle state, it indicates that the MDT log measurement configuration information is applicable to performing the MDT log measurement by the terminal in the inactive state and the idle state. Therefore, the terminal in the inactive state may perform the MDT log measurement based on the MDT log measurement configuration information, and the terminal in the idle state may also perform the MDT log measurement based on the MDT log measurement configuration information.

It should be noted that, the MDT log measurement configuration information may include any one or a combination of the first information, the third information, the fourth information, the measurement threshold, and the information used to indicate the terminal to perform the MDT log measurement in the inactive state; or the MDT log measurement configuration information may include any one or a combination of the first information, the third information, the fourth information, the measurement threshold, and the information used to indicate the terminal to perform the MDT log measurement in both the inactive state and the idle state; or the MDT log measurement configuration information may include any one or a combination of the first information and the second information, the third information, the fourth information, the measurement threshold, and the information used to indicate the terminal to perform the MDT log measurement in the inactive state; or the MDT log measurement configuration information may include any one or a combination of the first information and the second information, the third information, the fourth information, the measurement threshold, and the information used to indicate the terminal to perform the MDT log measurement in both the inactive state and the idle state.

It should be noted that the first information and the second information refer to a combination of the first information and the second information, and include the first information and the second information. Optionally, the foregoing signal measurement values may be classified into a cell-level signal measurement value and a beam-level signal measurement value. A signal measurement value includes any one or a combination of a cell signal measurement value and a signal measurement value of a downlink beam. Therefore, the signal measurement value of the serving cell includes any one or a combination of a cell signal measurement value of the serving cell and a signal measurement value of a downlink beam of the serving cell, and the signal measurement value of the neighboring cell may include a cell signal measurement value of the neighboring cell and a signal measurement value of a downlink beam of the neighboring cell.

In some embodiments, if the signal measurement value is a cell signal measurement value, the log record may include any one or a combination of the cell signal measurement value of the serving cell and the cell signal measurement value of the at least one neighboring cell.

In some embodiments, if the signal measurement value is a signal measurement value of a downlink beam, in an implementation, the log record may include any one or a combination of signal measurement values of all downlink beams of the serving cell and signal measurement values of all downlink beams of the at least one neighboring cell. To be specific, the log record may include: the signal measurement values of all downlink beams of the serving cell; or the signal measurement values of all downlink beams of the at least one neighboring cell; or the signal measurement values of all downlink beams of the serving cell and the signal measurement values of all downlink beams of the at least one neighboring cell.

In another implementation, the log record may include any one or a combination of signal measurement values of a maximum of N downlink beams with best quality of the serving cell and signal measurement values of a maximum of M downlink beams with best quality of the at least one neighboring cell, where N and M are integers greater than 0. Optionally, N may be equal or not equal to M. To be specific, the log record may include: the signal measurement values of the maximum of N downlink beams with best quality of the serving cell; or the signal measurement values of the maximum of M downlink beams with best quality of the at least one neighboring cell; or the signal measurement values of the maximum of N downlink beams with best quality of the serving cell and the signal measurement values of the maximum of M downlink beams with best quality of the at least one neighboring cell.

Optionally, N and M may be configured by the network device for the terminal, for example, included in the MDT log measurement configuration information.

Therefore, the log record may include the signal measurement value of the downlink beam, and is more applicable to quality assessment on a mobile network having a beam.

Optionally, the MDT log measurement configuration information may further include information indicating that the log record includes any one or a combination of the cell signal measurement value and the signal measurement value of the downlink beam. If the MDT log measurement configuration information includes information indicating that the log record includes the cell signal measurement value, the log record generated by the terminal includes any one or a combination of the cell signal measurement value of the serving cell and the cell signal measurement value of the at least one neighboring cell. If the MDT log measurement configuration information includes information indicating that the log record includes the signal measurement value of the downlink beam, the log record generated by the terminal includes any one or a combination of the signal measurement value of the downlink beam of the serving cell and the signal measurement value of the downlink beam of the at least one neighboring cell. If the MDT log measurement configuration information includes information indicating that the log record includes the cell signal measurement value and the signal measurement value of the downlink beam, the log record generated by the terminal includes: the cell signal measurement value of the serving cell and the signal measurement value of the downlink beam of the serving cell, or the cell signal measurement value of the at least one neighboring cell and the signal measurement value of the downlink beam of the at least one neighboring cell, or the cell signal measurement value of the serving cell, the signal measurement value of the downlink beam of the serving cell, the cell signal measurement value of the at least one neighboring cell, and the signal measurement value of the downlink beam of the at least one neighboring cell.

Optionally, if the MDT log measurement configuration information does not include information indicating that the log record includes any one or a combination of the cell signal measurement value and the signal measurement value of the downlink beam, the log record generated by the terminal includes, by default, any one or a combination of the signal measurement value of the downlink beam of the serving cell and the signal measurement value of the downlink beam of the at least one neighboring cell, and the log record does not include the cell signal measurement value of the serving cell and the cell signal measurement value of the at least one neighboring cell. Correspondingly, the network device receives the log record from the terminal. The log record includes any one or a combination of the signal measurement value of the downlink beam of the serving cell and the signal measurement value of the downlink beam of the at least one neighboring cell. The network device may obtain a cell signal measurement value of a corresponding cell based on the signal measurement value of the downlink beam. Therefore, signaling overheads can be reduced.

In some embodiments, the log record generated by the terminal in the inactive state further includes fifth information, and the fifth information indicates that the terminal is in the inactive state when the log record is generated. In the embodiments, if the log record is generated when the terminal is in the inactive state, to distinguish from a log record generated when the terminal is in the idle state, the log record generated in the inactive state in the embodiments further includes the fifth information, to indicate that the terminal is in the inactive state when generating the log record. Optionally, if the terminal generates the log record in the idle state based on the second timer, the log record may include information indicating that the terminal is in the idle state when generating the log record. Therefore, the log records generated in different RRC states may be distinguished, and the log records in different RRC states are used to assess the mobile network, to further improve accuracy of the mobile network assessment.

In some embodiments, if the terminal is in the inactive state, and the serving cell of the terminal is changed from a first cell to a second cell, the terminal obtains movement record information, and sends the movement record information to the network device.

The movement record information includes any one or a combination of sixth information, seventh information, or eighth information. The sixth information indicates that the terminal is in the inactive state in the first cell (namely, an RRC state of the terminal in the original serving cell). The seventh information indicates that the terminal is in the inactive state in the second cell (namely, an RRC state of the terminal in a new serving cell). The eighth information indicates that the terminal changes the serving cell from the first cell to the second cell through cell reselection, cell selection, or cell handover (namely, an operation performed by the terminal to change the serving cell).

For example, the movement record information includes the sixth information; or the movement record information includes the seventh information; or the movement record information includes the eighth information; or the movement record information includes the sixth information and the seventh information; or the movement record information includes the sixth information and the eighth information; or the movement record information includes the seventh information and the eighth information; or the movement record information includes the sixth information, the seventh information, and the eighth information.

Optionally, the terminal may send the movement record information and the log record to the network device through a same message, and the same message is, for example, a UE information response. Alternatively, the terminal may send the movement record information and the log record to the network device through different messages.

Optionally, the movement record information may alternatively be sent by the terminal to the network device as a part of the log record.

Optionally, the terminal further sends, to the network device, information indicating that the terminal has the movement record information. The network device sends information for requesting the movement record information to the terminal based on the information. After receiving the information for requesting the movement record information, the terminal sends the movement record information to the network device. For example, the information for requesting the movement record information may be included in the foregoing UE information request message.

Figure 4:
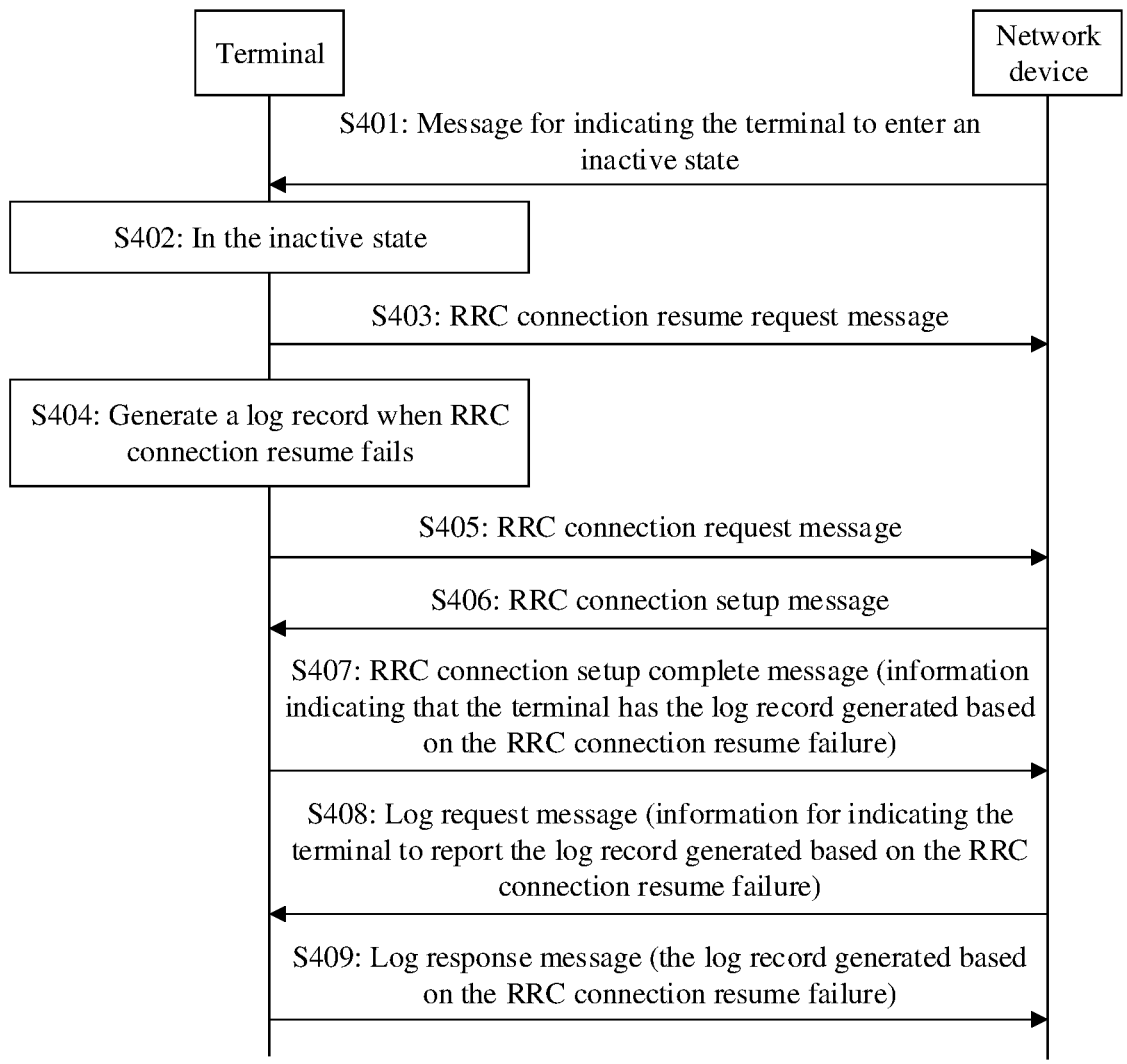
FIG. 4 is a flowchart of a communication method according to another embodiment of this application.

Based on the foregoing solution in which the terminal generates the log record when the RRC connection resume fails, an example is provided below for description with reference to FIG. 4. FIG. 4 is a flowchart of a communication method according to another embodiment of this application. As shown in FIG. 4, the method in this embodiment may include the following steps.

S401: A network device sends, to a terminal, a message for indicating the terminal to enter an inactive state.

In this embodiment, the network device may indicate the terminal to enter the inactive state. For example, the network device sends an RRC connection release message to the terminal, and the RRC connection release message includes information for indicating the terminal to enter the inactive state.

S402. The terminal enters the inactive state.

In this embodiment, after receiving the foregoing message, for example, the RRC connection release message, the terminal enters the inactive state according to the information that is in the RRC connection release message and used for indicating the terminal to enter the inactive state.

S403: The terminal sends an RRC connection resume request message to the network device.

In this embodiment, if the terminal needs to enter a connected state from the inactive state, the terminal sends the RRC connection resume request message to the network device, to request to resume an RRC connection.

S404: The terminal generates a log record when the RRC connection resume fails.

In this embodiment, the terminal requests the network device to resume the RRC connection. If the RRC connection resume fails, the terminal generates the log record. For descriptions of the log record, refer to the related descriptions in the foregoing embodiments. Details are not described herein again.

S405: The terminal sends an RRC connection request message to the network device.

In this embodiment, after the RRC connection resume fails, the terminal sends the RRC connection request message to the network device to request to establish an RRC connection.

S406: The network device sends an RRC connection setup message to the terminal.

In this embodiment, after receiving the RRC connection request message sent by the terminal, the network device sends the RRC connection setup message to the terminal.

S407: The terminal sends an RRC connection setup complete message to the network device.

In this embodiment, after receiving the RRC connection setup message sent by the network device, the terminal sends the RRC connection setup complete message to the network device. In this way, the terminal enters the connected state.

In a possible manner, the RRC connection setup complete message may include information indicating that the terminal has the log record generated based on the RRC connection resume failure.

Optionally, the information indicating that the terminal has the log record generated based on the RRC connection resume failure may alternatively be included in the RRC connection request message. In other words, the terminal may indicate, by using the RRC connection request message or the RRC connection setup complete message, the information that the terminal has the log record generated based on the RRC connection resume failure.

Optionally, the information indicating that the terminal has the log record generated based on the RRC connection resume failure may alternatively be referred to as available log indication information of the RRC connection resume failure.

S408: The network device sends a log request message to the terminal.

After the terminal enters the connected state, the network device may determine, based on the RRC connection request message or the RRC connection setup complete message, that the terminal has the log record generated based on the RRC connection resume failure, and then send the log request message to the terminal. In addition, the log request message includes information for indicating the terminal to report the log record generated based on the RRC connection resume failure. Optionally, the log request message is, for example, a UE information request.

S409: The terminal sends a log response message to the network device.

The terminal receives the log request message sent by the network device. The log request message includes the information indicating the terminal to report the log record generated based on the RRC connection resume failure. Then, the terminal sends the log response message to the network device. The log response message includes the log record generated by the terminal based on the RRC connection resume failure (namely, the log record generated by the terminal in S404). Optionally, the log response message is, for example, a UE information response. After receiving the log record, the network device may perform corresponding processing.

In conclusion, after entering the inactive state, if the RRC connection resume fails, the terminal generates the log record, and notifies the network device that the terminal has the log record generated based on the RRC connection resume failure. After the network device requests the log record generated based on the RRC connection resume failure from the terminal, the terminal reports the log record to the network device, so that the network device can obtain more log records for mobile network quality assessment. This satisfies a network requirement of a 5G mobile communications system and improves flexibility of the mobile network quality assessment.

In an embodiment, if the terminal in an idle state performs MDT log measurement, and generates a log record, the log record may include any one or a combination of a cell signal measurement value and a signal measurement value of a downlink beam. If the log record includes the signal measurement value of the downlink beam, the log record may include any one or a combination of signal measurement values of all downlink beams of a serving cell and signal measurement values of all downlink beams of at least one neighboring cell; or the log record may include any one or a combination of signal measurement values of N downlink beams with best quality of a serving cell and signal measurement values of M downlink beams with best quality of at least one neighboring cell, where N and M are integers greater than 0, and N may be equal or not equal to M. It should be noted that the embodiments described in this paragraph may be combined with the foregoing embodiments, or may be independent of the foregoing embodiments.

It may be understood that, in the foregoing embodiments, steps or operations implemented by the terminal may alternatively be implemented by a part (for example, a chip or a circuit) that may be used in the terminal, and steps or operations implemented by the network device may alternatively be implemented by a part (for example, a chip or a circuit) that may be used in the access network device. This is not limited in the embodiments of this application.

Figure 5:
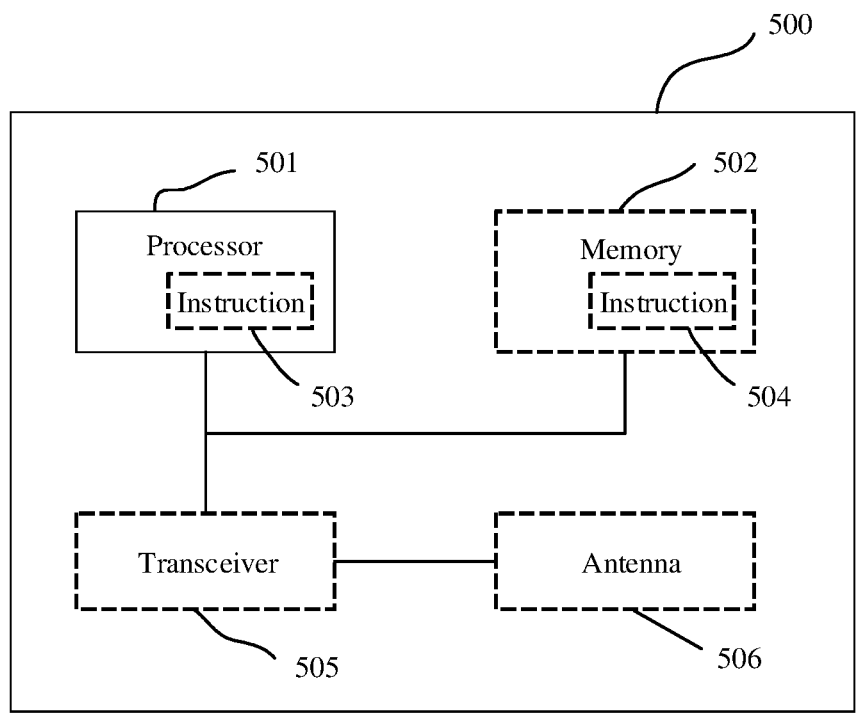
FIG. 5 is a schematic structural diagram of a communications apparatus according to an embodiment of this application.

FIG. 5 is a schematic structural diagram of a communications apparatus according to an embodiment of this application. As shown in FIG. 5, the communications apparatus 500 in this embodiment may be the terminal (or the part that can be used in the terminal) or the network device (or the part that can be used in the network device) mentioned in the foregoing method embodiments. The communications apparatus may be configured to implement a method that corresponds to the terminal or the network device and that is described in the foregoing method embodiments. For details, refer to the descriptions in the foregoing method embodiments.

The communications apparatus 500 may include one or more processors 501. The processor 501 may also be referred to as a processing unit, and may implement a specific control or processing function. The processor 501 may be a general-purpose processor, a dedicated processor, or the like. For example, the processor 501 may be a baseband processor or a central processing unit. The baseband processor may be configured to process a communication protocol and communication data. The central processing unit may be configured to control the communications apparatus, execute a software program, and process data of the software program.

In an optional design, the processor 501 may also store an instruction 503 or data (for example, intermediate data). The instruction 503 may be run by the processor, so that the communications apparatus 500 performs the method that corresponds to the terminal or the network device and that is described in the foregoing method embodiments.

In another possible design, the communications apparatus 500 may include a circuit. The circuit may implement the sending, receiving, or communication function in the foregoing method embodiments.

Optionally, the communications apparatus 500 may include one or more memories 502. The memory may store an instruction 504. The instruction may be run on the processor, so that the communications apparatus 500 performs the methods described in the foregoing embodiments.

Optionally, the memory may also store data. The processor and the memory may be disposed separately, or may be integrated together.

Optionally, the communications apparatus 500 may further include a transceiver 505 and/or an antenna 506. The processor 501 may be referred to as a processing unit, and controls the communications apparatus (the terminal or the network device). The transceiver 505 may be referred to as a transceiver unit, a transceiver machine, a transceiver circuit, a transceiver, or the like, and is configured to implement a transceiver function of the communications apparatus.

In a design, the communications apparatus 500 is configured to implement the operations corresponding to the terminal in the foregoing embodiments. For example, the processor 501 may generate a log record, where the log record is recorded by performing MDT log measurement when the terminal is in an inactive state, and the log record includes any one or a combination of location information of the terminal, a signal measurement value of a serving cell of the terminal, and a signal measurement value of at least one neighboring cell of the terminal; and the transceiver 505 sends the generated log record to the network device when the terminal is in a connected state.

For specific implementation processes of the transceiver 505 and the processor 501, refer to related descriptions in the foregoing embodiments. Details are not described herein again.

In another design, the communications apparatus is configured to implement the operations corresponding to the network device in the foregoing embodiments. For example, the transceiver 505 may receive a log record from the terminal, and the processor 501 processes the log record. The log record is generated by performing MDT log measurement when the terminal is in an inactive state. The log record includes any one or a combination of location information of the terminal, a signal measurement value of a serving cell of the terminal, and a signal measurement value of at least one neighboring cell of the terminal.

For a specific implementation process of the transceiver 505, refer to related descriptions in the foregoing embodiments. Details are not described herein again.

The processor 501 and the transceiver 505 that are described in this application may be implemented on an integrated circuit (IC), an analog IC, a radio frequency integrated circuit (RFIC), a mixed signal IC, an application-specific integrated circuit (ASIC), a printed circuit board (PCB), an electronic device, or the like. The processor and the transceiver may also be manufactured by using various 1C technologies, for example, a complementary metal oxide semiconductor (CMOS), an N-channel metal oxide semiconductor (n NMOS), a P-channel metal oxide semiconductor (PMOS), a bipolar junction transistor (BJT), a bipolar CMOS (BiCMOS), silicon germanium (SiGe), and gallium arsenide (GaAs).

In the descriptions of the foregoing embodiment, the communications apparatus 500 is described by using the terminal or the network device as an example, but the communications apparatus described in this application is not limited to the terminal or the network device, and a structure of the communications apparatus may not be limited by FIG. 5. The communications apparatus 500 may be an independent device or may be a part of a relatively large device. For example, the device may be:

(1) an independent integrated circuit IC, a chip, or a chip system or subsystem;

(2) a set including one or more ICs, where optionally, the IC set may further include a storage part configured to store data and/or an instruction;

(3) an ASIC, for example, a modem (MSM);

(4) a module that can be embedded in another device;

(5) a receiver, a terminal, a cellular phone, a wireless device, a handheld phone, a mobile unit, a network device, or the like; or (6) another device or the like.

Figure 6:
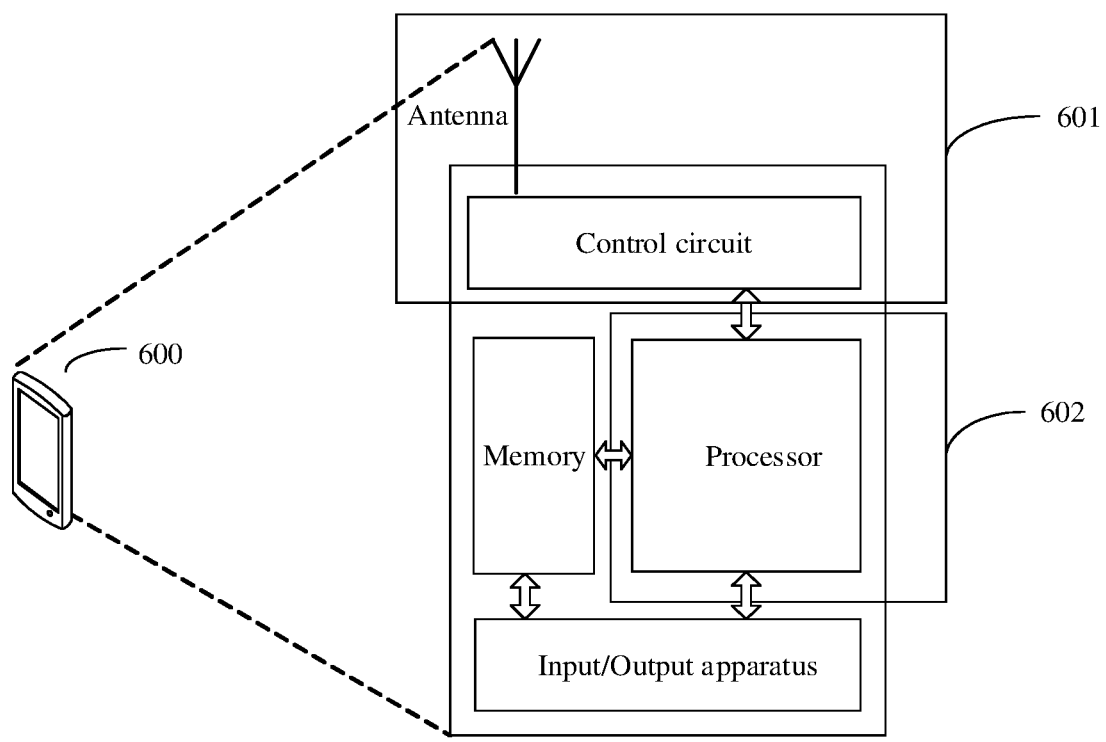
FIG. 6 is a schematic structural diagram of a terminal according to an embodiment of this application.

FIG. 6 is a schematic structural diagram of a terminal according to an embodiment of this application. The terminal may be applicable to the terminals in the foregoing embodiments of this application. For ease of description, FIG. 6 shows only main parts of the terminal. As shown in FIG. 6, the terminal 600 includes a processor, a memory, a control circuit, an antenna, and an input/output apparatus. The processor is mainly configured to: process a communication protocol and communication data, control the entire terminal, execute a software program, and process data of the software program. The memory is mainly configured to store the software program and the data. A radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data entered by a user and output data to the user.

After the terminal is powered on, the processor can read a software program in a storage unit, interpret and execute an instruction of the software program, and process data of the software program. When data needs to be sent wirelessly, the processor performs baseband processing on the to-be-sent data, and then outputs a baseband signal to the radio frequency circuit. The radio frequency circuit performs radio frequency processing on the baseband signal, and then sends, by using the antenna, a radio frequency signal in an electromagnetic wave form. When data is sent to the terminal, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that for ease of description, FIG. 6 shows only one memory and only one processor. An actual terminal may include a plurality of processors and a plurality of memories. The memory may also be referred to as a storage medium, a storage device, or the like. This is not limited in the embodiments of this application.

In an optional implementation, the processor may include a baseband processor and a central processing unit. The baseband processor is mainly configured to process a communication protocol and communication data, and the central processing unit is mainly configured to: control the entire terminal, execute a software program, and process data of the software program. The processor in FIG. 6 integrates functions of the baseband processor and the central processing unit. The person skilled in the art may understand that, alternatively, the baseband processor and the central processing unit may be independent processors, and interconnected by using a technology such as a bus. The person skilled in the art may understand that the terminal may include a plurality of baseband processors to adapt to different network standards, and the terminal may include a plurality of central processing units to enhance a processing capability of the terminal. All parts of the terminal may be connected by using various buses. The baseband processor may also be expressed as a baseband processing circuit or a baseband processing chip. The central processing unit may also be expressed as a central processing circuit or a central processing chip. A function of processing the communication protocol and the communication data may be embedded into the processor, or may be stored in the storage unit in a form of a software program, so that the processor executes the software program to implement a baseband processing function.

In an example, the antenna and the control circuit that have a transceiver function may be considered as a transceiver module 601 of the terminal 600, and the processor having a processing function may be considered as a processing module 602 of the terminal 600. As shown in FIG. 6, the terminal device 600 includes the transceiver module 601 and the processing module 602. The transceiver module may also be referred to as a transceiver, a transceiver machine, a transceiver apparatus, or the like. Optionally, a component that is configured to implement a receiving function and that is in the transceiver module 601 may be considered as a receiving module, and a component that is configured to implement a sending function and that is in the transceiver module 601 may be considered as a sending module. That is, the transceiver module 601 includes the receiving module and the sending module. The receiving module may also be referred to as a receiver, a receiver machine, a receiver circuit, or the like. The sending module may be referred to as a transmitter, a transmitter machine, a transmitter circuit, or the like.

Figure 7:
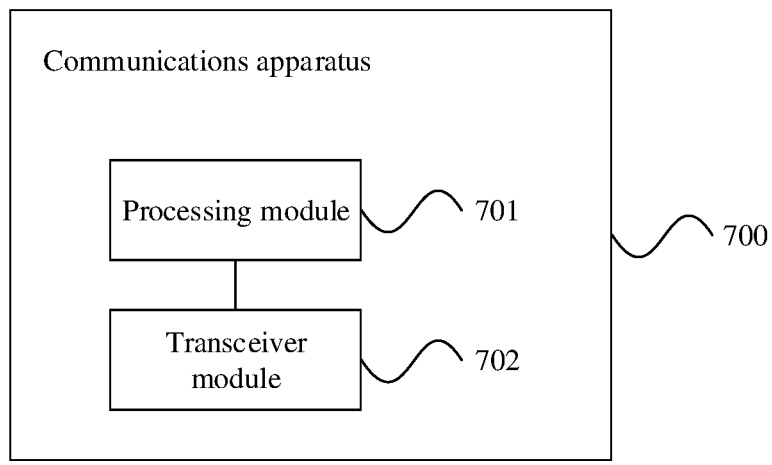
FIG. 7 is a schematic structural diagram of a communications apparatus according to another embodiment of this application.

FIG. 7 is a schematic structural diagram of a communications apparatus according to another embodiment of this application. The communications apparatus may be a terminal, or may be a part (for example, an integrated circuit or a chip) of a terminal, or may be another communications module, and is configured to implement the operations or steps corresponding to the terminal in the method embodiments shown in FIG. 3 and FIG. 4. The communications apparatus 700 may include a processing module 701 and a transceiver module 702.

The processing module 701 is configured to: perform MDT log measurement when the terminal in an inactive state, and generate a log record. The log record includes any one or a combination of location information of the terminal, a signal measurement value of a serving cell of the terminal, and a signal measurement value of at least one neighboring cell of the terminal, and the inactive state refers to an RRC state in which an air interface connection is suspended and context information is retained.

The transceiver module 702 is configured to send the generated log record to a network device when the terminal is in a connected state.

Optionally, the processing module 701 is specifically configured to: when a first time interval expires, generate the log record; and/or when RRC connection resume fails, generate the log record.

Optionally, the transceiver module 702 is further configured to receive MDT log measurement configuration information.

The processing module 701 is specifically configured to perform the MDT log measurement based on the MDT log measurement configuration information.

Optionally, the transceiver module 702 is specifically configured to receive the MDT log measurement configuration information through an RRC message.

Optionally, the RRC message is a message used to indicate the terminal to enter the inactive state.

Optionally, the MDT log measurement configuration information includes first information, and the first information is used to indicate that the MDT log measurement includes signal quality measurement.

Optionally, the MDT log measurement configuration information further includes second information, and the second information indicates that a semaphore of the signal quality measurement includes any one or a combination of RSRP, RSRQ, and an SINR.

Optionally, the MDT log measurement configuration information includes a measurement threshold.

The processing module 701 is specifically configured to generate the log record when the signal measurement value of the serving cell is less than or equal to the measurement threshold.

Optionally, the MDT log measurement configuration information includes third information, and the third information indicates the first time interval.

Optionally, the MDT log measurement configuration information includes fourth information, and the fourth information indicates duration of the MDT log measurement configuration information.

The processing module 701 is further configured to: after the transceiver module 702 receives the MDT log measurement configuration information, start a timer, where duration of the timer is the duration.

When performing the MDT log measurement, the processing module 701 is specifically configured to: before the timer expires, perform the MDT log measurement based on the log measurement configuration information.

Optionally, the signal measurement value includes any one or a combination of a cell signal measurement value and a signal measurement value of a downlink beam.

Optionally, the log record further includes fifth information, and the fifth information indicates that the terminal is in the inactive state when the log record is generated.

Optionally, the processing module 701 is further configured to: store, in a first variable, the log record generated when the first time interval expires; and/or store, in a second variable, the log record generated when the RRC connection resume fails.

Optionally, the transceiver module 702 is further configured to: before sending the generated log record to the network device, send a first message to the network device, where the first message includes information used to indicate that the terminal has the log record generated based on the first time interval, and/or information used to indicate that the terminal has the log record generated based on the RRC connection resume failure; and receive a second message from the network device, where the second message includes information used to request the log record.

The communications apparatus in this embodiment may be configured to execute the technical solutions of the terminal in the foregoing method embodiments. The implementation principles and technical effects are similar, and details are not described herein again.

Figure 8:
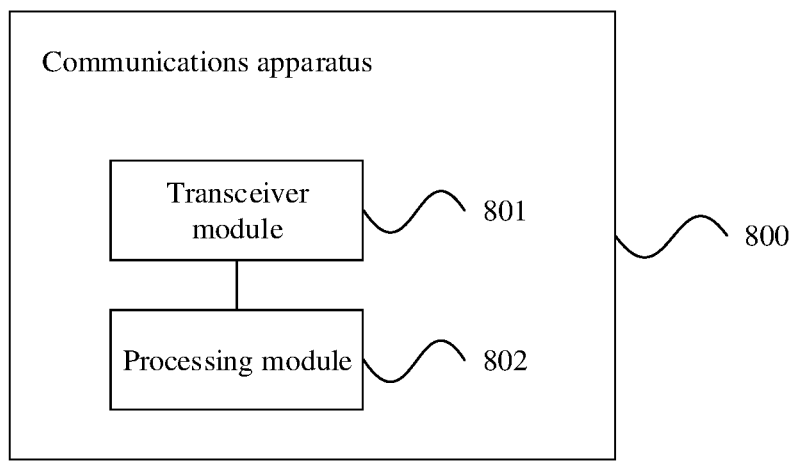
FIG. 8 is a schematic structural diagram of a communications apparatus according to still another embodiment of this application.

FIG. 8 is a schematic structural diagram of a communications apparatus according to still another embodiment of this application. The communications apparatus may be a network device, or may be a part (for example, an integrated circuit or a chip) of a network device, or may be another communications module, and is configured to implement the operations corresponding to the network device in the method embodiments shown in FIG. 3 and FIG. 4. The communications apparatus 80o may include a transceiver module 801 and a processing module 802.

The transceiver module 801 is configured to receive a log record from a terminal.

The processing module 802 is configured to process the log record.

The log record is generated by performing MDT log measurement when the terminal is in an inactive state, where the inactive state refers to an RRC state in which an air interface connection is suspended and context information is retained. The log record includes any one or a combination of location information of the terminal, a signal measurement value of a serving cell of the terminal, and a signal measurement value of at least one neighboring cell of the terminal.

Optionally, the log record is generated by the terminal when a first time interval expires; and/or generated when RRC connection resume fails.

Optionally, the transceiver module 801 is configured to send MDT log measurement configuration information to the terminal, and the MDT log measurement configuration information is used by the terminal to perform the MDT log measurement.

Optionally, the transceiver module 801 is specifically configured to send the MDT log measurement configuration information to the terminal through an RRC message.

Optionally, the RRC message is a message used to indicate the terminal to enter the inactive state.

Optionally, the MDT log measurement configuration information includes first information, and the first information indicates that the MDT log measurement includes signal quality measurement.

Optionally, the MDT log measurement configuration information further includes second information, and the second information indicates that a semaphore of the signal quality measurement includes any one or a combination of RSRP, RSRQ, and an SINR.

Optionally, the MDT log measurement configuration information further includes a measurement threshold, and the measurement threshold is used by the terminal to generate the log record when the signal measurement value of the serving cell is less than or equal to the measurement threshold.

Optionally, the MDT log measurement configuration information further includes third information, and the third information indicates the first time interval.

Optionally, the MDT log measurement configuration information further includes fourth information, and the fourth information indicates duration of the MDT log measurement configuration information.

Optionally, the signal measurement value includes any one or a combination of a cell signal measurement value and a signal measurement value of a downlink beam.

Optionally, the log record further includes fifth information, and the fifth information indicates that the terminal is in the inactive state when the log record is generated.

Optionally, the transceiver module 801 is further configured to: before receiving the log record from the terminal, receive a first message from the terminal, where the first message includes information used to indicate that the terminal has the log record generated based on the first time interval, or information used to indicate that the terminal has the log record generated based on the RRC connection resume failure; and send a second message to the terminal, where the second message includes information used to request the log record.

The communications apparatus in this embodiment may be configured to execute the technical solutions of the network device in the foregoing method embodiments. The implementation principles and technical effects are similar, and details are not described herein again.

It should be noted that module division in the embodiments of this application is an example, and is merely logical function division. During actual implementation, another division manner may be used. Function modules in the embodiments of this application may be integrated into one processing module, or each of the modules may exist alone physically, or two or more modules are integrated into one module. The integrated module may be implemented in a form of hardware, or may be implemented in a form of a software function module.

When the integrated module is implemented in the form of a software function module and sold or used as an independent product, the integrated module may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

All or some of the foregoing embodiments may be implemented by using software, hardware, firmware, or any combination thereof. When being implemented by using the software, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A communication method, comprising:
   receiving minimization of drive tests (MDT) log measurement configuration information, wherein the MDT log measurement configuration information comprises information indicating a duration of the MDT log measurement configuration information, and the MDT log measurement configuration information is valid in the duration of the MDT log measurement configuration information;
   starting a timer, wherein a duration of the timer is the duration of the MDT log measurement configuration information;
   generating a log record, wherein the log record comprises information recorded by performing MDT log measurements by a terminal, the log record comprises any one or a combination of location information of the terminal, a signal measurement value of a serving cell of the terminal, or a signal measurement value of at least one neighboring cell of the terminal, wherein the terminal is able to be in an idle state, an inactive state, or an active state, wherein the idle state, the inactive state, and the active state are different states, and wherein when the terminal is in the inactive state an air interface connection of the terminal is suspended and context information is retained, and wherein generating the log record comprises:
   generating the log record in the duration of the timer while the terminal is in the inactive state, wherein in a case that, before the timer expires, the terminal moves from the inactive state to an idle state the log record is continued to be generated based on the MDT log measurement configuration information, and in a case that the terminal is in a connected state before the timer expires, generating the log record is stopped while the terminal is in the connected state; and
   when the terminal is in the connected state, sending the generated log record to a network device.

2. The method according to claim 1, wherein generating the log record further comprises:
   when a first time interval expires, generating the log record; or
   when a radio resource control (RRC) connection resume process fails, generating the log record.

3. The method according to claim 2, wherein the MDT log measurement configuration information comprises third information, and the third information indicates the first time interval.

4. The method according to claim 2, further comprising:
   storing, in a first variable, the log record generated when the first time interval expires; or
   storing, in a second variable, the log record generated when the RRC connection resume process fails.

5. The method according to claim 2, wherein before sending the generated log record to the network device, the method further comprises:
   sending a first message to the network device, wherein the first message comprises information indicating that the terminal generated the log record based on the first time interval, or information indicating that the terminal generated the log record based on the RRC connection resume process failing; and
   receiving a second message from the network device, wherein the second message comprises information requesting the log record.

6. The method according to claim 1, wherein receiving the MDT log measurement configuration information comprises:
   receiving the MDT log measurement configuration information through a radio resource control (RRC) message.

7. The method according to claim 6, wherein the RRC message indicates to the terminal to enter the inactive state.

8. The method according to claim 1, wherein the MDT log measurement configuration information further comprises first information, and the first information indicates that the MDT log measurements that will be logged comprise signal quality measurement.

9. The method according to claim 8, wherein the MDT log measurement configuration information further comprises second information, and the second information indicates that a semaphore in the signal quality measurement comprises any one or a combination of reference signal received power (RSRP), reference signal received quality (RSRQ), or a signal to interference plus noise ratio (SINR).

10. The method according to claim 1, wherein the MDT log measurement configuration information comprises a measurement threshold; and
    wherein generating the log record comprises:
    generating the log record when the signal measurement value of the serving cell is less than or equal to the measurement threshold.

11. The method according to claim 1, wherein the signal measurement value comprises any one or a combination of a cell signal measurement value or a signal measurement value of a downlink beam.

12. The method according to claim 1, wherein the log record further comprises fifth information, and the fifth information indicates that the terminal is in the inactive state when the log record is generated.

13. The method according to claim 1, wherein the log record further comprises information indicating that the terminal is in the idle state when the log record is generated.

14. A communications apparatus, comprising:
at least one circuitry configured to:
receive minimization of drive tests (MDT) log measurement configuration information, wherein the MDT log measurement configuration information comprises information indicating a duration of the MDT log measurement configuration information, and the MDT log measurement configuration information is valid in the duration of the MDT log measurement configuration information;
start a timer, wherein duration of the timer is the duration of the MDT log measurement configuration information;
generate a log record, wherein the log record comprises information recorded by performing MDT log measurements by a terminal, the log record comprises any one or a combination of location information of the terminal, a signal measurement value of a serving cell of the terminal, or a signal measurement value of at least one neighboring cell of the terminal, wherein the terminal is able to be in an idle state, an inactive state, or an active state, wherein the idle state, the inactive state, and the active state are different states, and when the terminal is in the inactive state an air interface connection of the terminal is suspended and context information of the terminal is retained, and generating the log record comprises:
generating the log record in the duration of the timer while the terminal is in the inactive state, wherein in a case that, before the timer expires, the terminal moves from the inactive state to an idle state the log record is continued to be generated based on the MDT log measurement configuration information, and in a case that the terminal is in a connected state before the timer expires, generating the log record is stopped while the terminal is in the connected state; and
when the terminal is in a connected state, send the generated log record to a network device.

15. The apparatus according to claim 14, wherein the at least one circuitry is further configured to:
when a first time interval expires, generate the log record; or
when a radio resource control (RRC) connection resume process fails, generate the log record.

16. The apparatus according to claim 14, wherein the MDT log measurement configuration information further comprises second information, and the second information indicates that a semaphore in a signal quality measurement in the MDT log measurements comprises any one or a combination of reference signal received power (RSRP), reference signal received quality (RSRQ), or a signal to interference plus noise ratio (SINR).

17. The apparatus according to claim 14, wherein the MDT log measurement configuration information comprises a measurement threshold; and the at least one circuitry is further configured to:
generate the log record when the signal measurement value of the serving cell is less than or equal to the measurement threshold.

18. The apparatus according to claim 14, wherein the signal measurement value comprises any one or a combination of a cell signal measurement value or a signal measurement value of a downlink beam.

19. The apparatus according to claim 14, wherein the log record further comprises fifth information, and the fifth information indicates that the terminal is in the inactive state when the log record is generated.

20. The apparatus according to claim 14, wherein the log record further comprises information indicating that the terminal is in the idle state when the log record is generated.

* * * * *